United States Patent
Xi et al.

(10) Patent No.: US 11,174,184 B2
(45) Date of Patent: Nov. 16, 2021

(54) METHOD AND DEVICE FOR CONTROLLING POLLUTANTS IN BASIN WATER USED FOR IRRIGATING FARMLAND IN EXTREMELY WATER-SCARCE AREAS

(71) Applicant: CHINESE RESEARCH ACADEMY OF ENVIRONMENTAL SCIENCES, Beijing (CN)

(72) Inventors: Beidou Xi, Beijing (CN); Lei Wang, Beijing (CN); Jinsheng Wang, Beijing (CN); Wenbing Tan, Beijing (CN); Tongtong Li, Beijing (CN); Yangyang Wang, Beijing (CN); Hui Liu, Beijing (CN); Ruyue Yang, Beijing (CN); Yali Zhang, Beijing (CN); Feng Wu, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 0 days.

(21) Appl. No.: 16/770,819

(22) PCT Filed: Dec. 12, 2018

(86) PCT No.: PCT/CN2018/120544
§ 371 (c)(1),
(2) Date: Jun. 8, 2020

(87) PCT Pub. No.: WO2019/114746
PCT Pub. Date: Jun. 20, 2019

(65) Prior Publication Data
US 2020/0392027 A1 Dec. 17, 2020

(30) Foreign Application Priority Data
Dec. 13, 2017 (CN) .......................... 201711332307.1

(51) Int. Cl.
*C02F 9/00* (2006.01)
*C02F 1/28* (2006.01)
(Continued)

(52) U.S. Cl.
CPC ................ *C02F 9/00* (2013.01); *C02F 1/281* (2013.01); *C02F 1/283* (2013.01); *C02F 1/288* (2013.01);
(Continued)

(58) Field of Classification Search
CPC .. C02F 9/00; C02F 1/281; C02F 1/283; C02F 1/288; C02F 3/305; C02F 3/308;
(Continued)

(56) References Cited

U.S. PATENT DOCUMENTS 8,021,551 B2 * 9/2011 Harrison ................. C02F 3/046
210/602
2012/0018374 A1 * 1/2012 Sun ......................... C02F 3/308
210/605
(Continued)

FOREIGN PATENT DOCUMENTS

CN 101481194 A * 7/2009
CN 101693588 A * 4/2010
(Continued)

OTHER PUBLICATIONS

Machine-generated English Translation of CN 205011567, dated Jun. 1, 2021.*
(Continued)

*Primary Examiner* — Fred Prince
(74) *Attorney, Agent, or Firm* — CBM Patent Consulting, LLC

(57) ABSTRACT

The present invention relates to a method and a device for controlling pollutants in basin water used for irrigating farmland in extremely water-scarce areas. The device
(Continued)

includes an alternate vertical flow constructed wetland, which is constructed 4-10 m far from basin revetment. After feeding basin water into the constructed wetland, pollutants, such as heavy metals, nitrogen, phosphorus and organic matters, are adsorbed or degraded through the constructed wetland, and then the treated basin water is transported to the farmland.

8 Claims, 1 Drawing Sheet

(51) Int. Cl.
| | | |
|---|---|---|
| | *C02F 3/30* | (2006.01) |
| | *C02F 3/32* | (2006.01) |
| | *C02F 3/34* | (2006.01) |
| | C02F 101/10 | (2006.01) |
| | C02F 101/20 | (2006.01) |
| | C02F 101/30 | (2006.01) |

(52) U.S. Cl.
CPC .............. *C02F 3/305* (2013.01); *C02F 3/308* (2013.01); *C02F 3/322* (2013.01); *C02F 3/327* (2013.01); *C02F 3/34* (2013.01); *C02F 2101/105* (2013.01); *C02F 2101/20* (2013.01); *C02F 2101/30* (2013.01); *C02F 2209/02* (2013.01)

(58) Field of Classification Search
CPC .. C02F 3/322; C02F 3/327; C02F 3/34; C02F 2101/105; C02F 2101/20; C02F 2101/30; C02F 2209/02; C02F 3/30; Y02W 10/10
USPC ....... 210/602, 605, 615, 616, 617, 630, 903, 210/259, 290, 906
See application file for complete search history.

(56) References Cited

U.S. PATENT DOCUMENTS

2016/0017588 A1\* 1/2016 Chai ......................... E03B 3/02
   210/170.03
2019/0352204 A1\* 11/2019 Jiang ........................ E03F 5/14

FOREIGN PATENT DOCUMENTS

| CN | 205011567 U | \* | 2/2016 |
| CN | 106111062 A | \* | 11/2016 |

OTHER PUBLICATIONS

Machine-generated English Translation of CN 101481194, dated Jun. 1, 2021.\*
Machine-generated English Translation of CN 106111062, dated Jun. 1, 2021.\*
Machine-generated English Translation of CN 101693588, dated Jun. 1, 2021.\*

\* cited by examiner

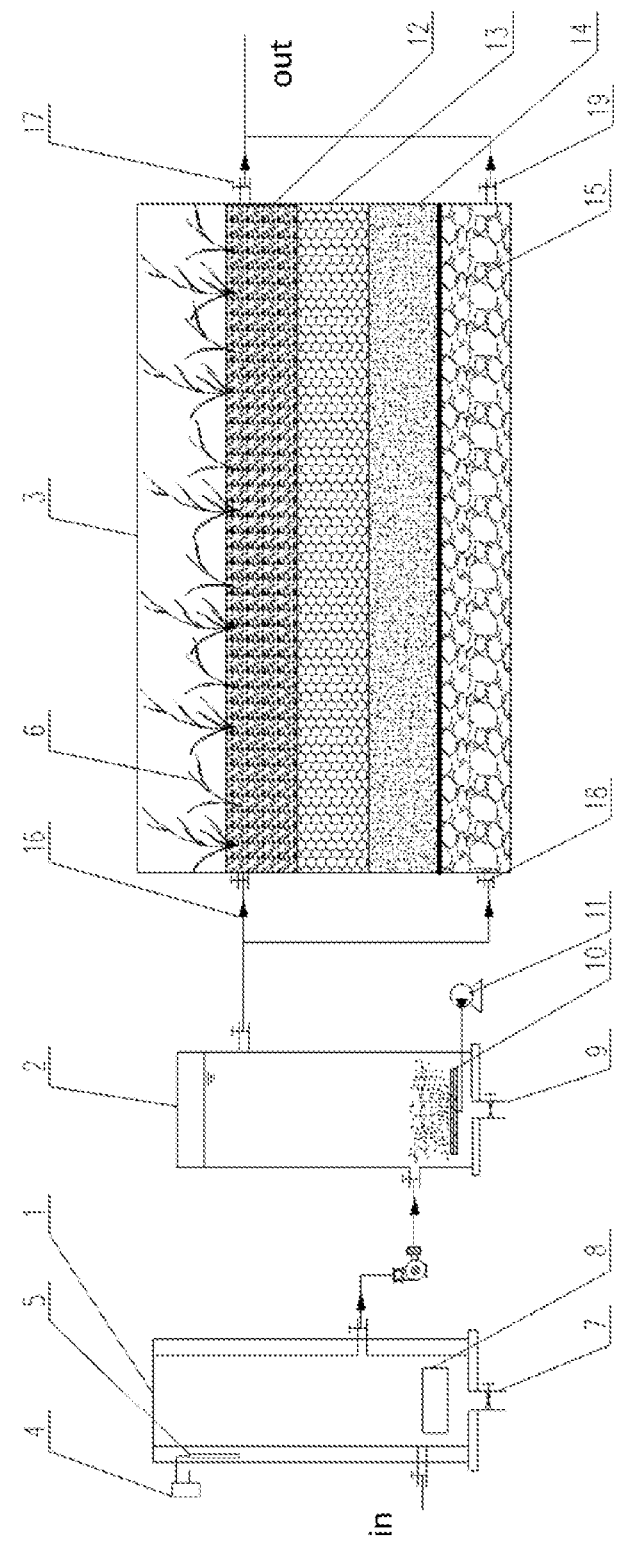

METHOD AND DEVICE FOR CONTROLLING POLLUTANTS IN BASIN WATER USED FOR IRRIGATING FARMLAND IN EXTREMELY WATER-SCARCE AREAS

TECHNICAL FIELD

The invention belongs to the field of basin water utilization, and particularly relates to a method and a device for controlling pollutants in basin water used for irrigating farmland in extremely water-scarce areas.

BACKGROUND ART

It is urgent to develop irrigated agriculture in drought regions because of the scarcity of water. In water-scarce areas, plants are not suitable for growth due to drought, uneven precipitation, or rainfall does not meet the cycle of the plant growth. Sufficient water supply can be provided artificially through the development of the irrigated agriculture. In areas or seasons with little natural precipitation, basin water or water conservancy projects are usually used to irrigate crops, therefore keeping crops growing normally and allowing plants to get enough water during the growth cycle for high yields.

At present, the main problems of basin water resources utilization are water shortage and deterioration of water environment. The reasons for the shortage of water resources are the uneven distribution of water resources in China and the increasing demand for water resources with the population growth, or the unreasonable exploitation and utilization of water resources. The deterioration of the water environment is due to the following reasons: firstly, the untreated or unqualified discharge of domestic sewage increases the total phosphorus and total nitrogen in water, resulting in eutrophication of basin water; secondly, the effluent of industrial wastewater and solid waste is directly discharged into water, which increases the toxic heavy metals in basin water, thereby causing heavy metal pollution in basin water. Therefore, how to conserve and utilize effective water resources, do a good job in water environmental protection, and ensure the sustainable development of the socio-economic of various basins with the sustainable use of water resources are urgent problems to be solved. The formulation of scientific basin water resources development and utilization planning is the fundamental choice for realizing the sustainable development and utilization of basin water resources and maintaining the health of the basin ecosystem. Comprehensive, scientific and sustainable comprehensive basin planning is beneficial to fundamentally contain the deterioration trend of water pollution.

It is estimated that more than 20% of the farmland soil in China is currently contaminated by heavy metals. Because heavy metals in soil are difficultly degraded, easily accumulated and highly toxic, not only will they seriously affect the growth of crops, but they may also enter the human body along the food chain, thereby harming human health. The level of food safety and agricultural greening is directly determined by the health of farmland soil. Therefore, it is necessary to consider the development of control technologies for water pollutants, especially heavy metal pollutants, in basin water used for irrigating farmland according to local conditions. In particular, the development of harmless and usable devices is crucial. The development of the device strives to not affect the environment and at the same time have a certain economic return, thereby achieving a healthy industry for overall governance and development, and promoting the sustainable development of environmentally friendly agriculture with the dual-wheel drive of economic and ecological benefits.

Based on the above situation, it is necessary to develop a method and a device for controlling pollutants in basin water used for irrigating farmland in extremely water-scarce areas. The method and the device can prevent and control the content of pollutants that will enter the farmland, such as heavy metals, fundamentally reduce heavy metals in crops, promote crop growth, and maintain sustainable and healthy development of agriculture, and thus protect human health and safety.

CONTENTS OF THE INVENTION

In order to solve the above problems, the present inventors have conducted intensive studies, and provide a device including an acidification tank, an aeration tank and an alternate vertical flow constructed wetland beside the revetment of the basin in extremely water-scarce areas. The pollutants (including nitrogen, phosphorus, organic matters, heavy metals, and so on) in basin water are reduced or removed through the synergistic physical, chemical and biological effects among plants, microorganisms and solid substrates in the device, and to achieve the purification of basin water, thereby completing the present invention.

The object of the present invention is to provide the following technical solutions:

(1) A device for controlling pollutants in basin water used for irrigating farmland in extremely water-scarce areas, wherein, the device includes an alternate vertical flow constructed wetland 3, which is constructed at a set distance far from basin revetment, and basin water to be purified is fed into the alternate vertical flow constructed wetland 3, and also into one or more layers of fillers laid in the alternate vertical flow constructed wetland 3 to degrade or remove pollutants;

preferably, the constructed wetland is provided with four layers of fillers from top to bottom:

the first layer of filler 12 is a mixed filler of soil and functional biochar, which adsorbs heavy metals and degrades organic matters;

the second layer of filler 13 is a mixed filler of soil, natural zeolite and limestone, which adsorbs and fixes heavy metals;

the third layer of filler 14 is a mixed filler of fly ash molecular sieve, Flory diatomaceous earth and biochar, which adsorbs heavy metals, and preferably phosphorus-accumulating bacteria is added in this area to reduce the total phosphorus content of basin water to be purified;

the fourth layer of filler 15 is a mixed filler of pebbles and biochar, which adsorbs heavy metals, and preferably phosphorus-accumulating bacteria is allowed to perform anaerobic living activities in this area by constructing anaerobic environment (such as decomposing polyphosphate in the body under anaerobic conditions to maintain living activities).

(2) A method for controlling pollutants in basin water used for irrigating farmland in extremely water-scarce areas, characterized in that, the method includes: providing an alternate vertical flow constructed wetland 4-10 m far from basin revetment in extremely water-scarce areas, feeding basin water into the alternate vertical flow constructed wetland, and also into one or more layers of fillers laid in the alternate vertical flow constructed wetland to degrade or remove pollutants, thereafter transporting the treated basin water into the farmland, and preferably, the method further includes: providing an acidification tank and an aeration tank connected in sequence with the alternate vertical flow constructed wetland, salvaging duckweed and algae in the basin, then acidizing and digesting them in the acidification tank, importing the supernatant from the acidification tank into the aeration tank for further degradation, thereafter mixing water from the aeration tank with basin water and importing them into the alternate vertical flow constructed wetland.

According to the present invention, the method and the device for controlling pollutants in basin water used for irrigating farmland in extremely water-scarce areas have the following beneficial effects:

(1) The alternate vertical flow constructed wetland in the present invention is constructed by laying multiple layers of fillers, and the types of fillers, dosage ratio, particle size and filling height of filler in each layer are specifically selected, so that heavy metal adsorption, dephosphorization and denitrification can be effectively realized in the alternate vertical flow constructed wetland.

(2) In the present invention, specific wetland plants are planted in the constructed wetland, which is beneficial to the enrichment of heavy metals, and the obtained wetland plants enriched with heavy metals can be reused to prepare functional biochar with photocatalytic effect.

(3) In the present invention, multiple operation modes can be performed by the alternate vertical flow constructed wetland, including the vertical downflow operation mode, vertical up flow operation mode and the submerged flow operation mode, therefore avoiding the decline in the purification capacity of the constructed wetland caused by a single mode of long-term operation, and extending the effective period of purification, improving the purification effect and reducing the maintenance cost of the device.

(4) In the present invention, an acidification tank and an aeration tank are built to provide nutrients (mainly a carbon source) to the microorganisms in the alternate vertical flow constructed wetland, promote the reproduction of microorganisms, and facilitate the dephosphorization and denitrification of the microorganisms in the alternate vertical flow constructed wetland.

(5) In the present invention, the denitrifying bacteria are inoculated in the river channel. Basin water to be treated will inevitably be further purified by the addition of denitrifying bacteria, especially anaerobic denitrifying bacteria. Meanwhile, the synergistic effect of anaerobic denitrifying bacteria and anaerobic denitrifying bacteria added in the alternate vertical flow constructed wetland will promote the water purification.

DESCRIPTION OF FIGURES

FIG. 1 shows a schematic diagram of the device for controlling pollutants in basin water used for irrigating farmland in extremely water-scarce areas according to a preferred embodiment of the present invention;

DESCRIPTION OF THE REFERENCE SIGNS

1—acidification tank;
2—aeration tank;
3—alternate vertical flow constructed wetland;
4—temperature control device;
5—temperature probe;
6—wetland plant
7—sludge discharge hole
8—agitator
9—secondary sludge discharge hole
10—aeration disk
11—nano-aerator
12—first layer of filler
13—second layer of filler
14—third layer of filler
15—fourth layer of filler
16—first inlet pipe
17—first outlet pipe
18—second inlet pipe
19—second outlet pipe

SPECIFIC EMBODIMENTS FOR CARRYING OUT THE INVENTION

The present invention will be described in more detail through preferred embodiments and examples. Through these descriptions, the features and advantages of the present invention will become clear.

The term "exemplary" as used herein is intended to be "serving as an example, an illustrative embodiment, or an embodiment". Any of the embodiments described herein as "exemplary" need not be construed as preferred as or better than other embodiments. Although various aspects of the examples are shown in the figures, unless specifically noted, the figures are not necessarily drawn to scale.

Aiming at the drought and water shortage in extremely water-scarce areas in China, a technical route of using basin water for irrigation is proposed. However, in current status of basin water irrigation, untreated water is extracted directly from basin water and fed into the farmland after simple filtration to remove obvious impurities. Although the methods have low cost and large water intake, pollutants such as heavy metals, total phosphorus or total nitrogen cannot be controlled in basin water, which affects the growth and harvest of crops, more seriously will lead to excessive heavy metals in crops, unusable food, soil compaction, thus cause significant losses.

Based on the above, the present inventors conduct intensive studies, and provide a device for controlling pollutants in basin water used for irrigating farmland in extremely water-scarce areas, as shown in FIG. 1, to effectively control the content of pollutants, such as heavy metals, total nitrogen and total phosphorus in basin water fed into the farmland.

In the present invention, the device for controlling pollutants in basin water used for irrigating farmland in extremely water-scarce areas includes an alternate vertical flow constructed wetland 3, which is constructed at a set distance far from basin revetment, and basin water to be purified is fed into the alternate vertical flow constructed wetland 3, and also into one or more layers of fillers laid in the alternate vertical flow constructed wetland 3 to degrade or remove pollutants, such as degradation of organic matters, fixation and removal of heavy metals, denitrification and dephosphorization.

In a preferred embodiment of the present invention, the alternate vertical flow constructed wetland 3 is constructed 4-10 m far from basin revetment in extremely water-scarce areas, which is convenient for diversion and purification of basin water.

In a preferred embodiment of the present invention, the alternate vertical flow constructed wetland 3 is provided with three to six layers of fillers from top to bottom, and the filler of each layer can be selected from one or more of soil, biochar, functional biochar, ore particles such as gravel, natural zeolite, volcanic stone, calcite, limestone, pebbles, and so on, diatomaceous earth or Flory diatomaceous earth.

In a preferred embodiment of the present invention, the alternate vertical flow constructed wetland 3 is provided with four layers of fillers from top to bottom:

the first layer of filler 12 adsorbs heavy metals and degrades organic matters;

the second layer of filler 13 adsorbs and fixes heavy metals;

the third layer of filler 14 adsorbs heavy metals, and phosphorus-accumulating bacteria is added in this area to reduce the phosphorus content of basin water to be purified;

the fourth layer of filler 15 adsorbs heavy metals, and phosphorus-accumulating bacteria is allowed to dephosphorize in this area by constructing anaerobic environment, so its phosphorus-accumulation ability in the third layer of filler is promoted. And anaerobic denitrifying bacteria are added to reduce the nitrogen content of basin water to be purified.

In a preferred embodiment of the present invention, the first layer of filler 12 is laid at 0-500 cm, and the first layer of filler 12 is a mixed filler of soil and functional biochar, and the mixing ratio is 3:(6-8), and preferably 3:7.

Wherein, biochar is a material with high carbon content obtained from biomass after high temperature treating and deoiling under anoxic conditions. Functional biochar is biochar loaded with transition metals.

Functional biochar has the following characteristics of biochar:

(1) In term of microstructure, it has characteristics of porosity, and biochar has a controlled porosity compared to other materials, namely micropores (<0.9 nm), small pores (<2 nm) and large pores (>50 nm). The large pores can ensure the aeration and water retention capacity of soil used with it, and also provide a place for microorganisms to survive and reproduce, thereby improving the activity and reproduction rates of the microorganisms; micropores and small pores affect the adsorption and transfer of molecules by biochar, and the pore structure of biochar can reduce the rate of water penetration and enhance the adsorption capacity of soil for nutrients that are highly mobile and easily leached. Thus, the porous structure is conducive to the growth of plants on the first layer of filler.

(2) The porosity of biochar determines its large surface area, and a large amount of organic matters in the regional water can be adsorbed, which is conducive to the degradation of organic matters after adsorption.

(3) The surface of the biochar has carboxyl, phenolic hydroxyl, and carbonyl oxygen-containing functional groups. The biochar has high cation exchange capacity because of negative surface charges generated by the above functional groups, and thus can effectively adsorb heavy metal ions in basin water.

It is worth noting that in addition to the above-mentioned characteristics of biochar, the functional biochar is loaded with transition metals (such as nickel, cobalt and iron), therefore water molecules or hydroxides adsorbed on the surface of the functional biochar are oxidized in the presence of oxygen through the photocatalysis of transition metals to generate active oxygen such as hydroxyl radical (.OH), and thus organic pollutants are degraded, desulfurized (S), and dechlorinated (Cl), thereby reducing their toxicity and odor.

In the present invention, the first layer of filler 12 is mainly composed of the functional biochar, and soil is added as an auxiliary, which is beneficial to the planting of the plants on the first layer of filler 12. After experiments, it is found that when soil and functional biochar were mixed with a weight ratio of 3:(6-8), good growth of plants could be achieved due to the fixation of the activated carbon to the soil, and a large amount of organic matters can be absorbed by the filler with functional biochar as main part, then be effectively degraded through the photocatalysis of transition metal ions. If the weight ratio of soil to functional biochar is less than 3:8, namely the ratio of soil decreases, plants grow slowly due to lack of necessary nutrients. If the weight ratio of soil to functional biochar is more than 3:6, the photocatalytic effect is reduced, so the degradation efficiency of organic matters decreases.

In a further preferred embodiment, the particle size of the filler in the first layer of filler 12, especially of the functional biochar, is 0.10-0.30 cm. Within this particle size range, the support of functional biochar to soil is beneficial for air to enter the filler layer, and the plant roots are effectively contacted with air, which is beneficial to the growth of wetland plants planted on the first layer of filler 12. The functional biochar located in the lower part of the water body undergoes photocatalytic reaction in the presence of oxygen to achieve effective degradation. If the particle size of the functional biochar is less than 0.10 cm, it is unfavorable for air to enter the filler layer, and is also unfavorable for plant growth and degradation of organic pollutants because of the lack of oxygen. If the particle size of the functional biochar is greater than 0.30 cm, the larger particle size is not beneficial to photocatalytic efficiency due to the smaller surface area.

In a further preferred embodiment, wetland plants 6, preferably cattail and calamus, are planted on the first layer of filler 12. Cattail and calamus can grow normally in eutrophic water bodies, showing good water purification effects. The values of total nitrogen, total phosphorus and chemical oxygen demand (COD) in water can be effectively reduced by them. It is noteworthy that cattail and calamus show extremely high enrichment capacity for heavy metals, and the accumulation of heavy metals in the two plants is more than 100 times that of ordinary aquatic plants, while their normal growth is not affected. Heavy metals can be completely removed from the water body by harvesting plants. Therefore, both of the wetland plants are selected for planting, which is an effective ecological method for reducing heavy metals.

In a further preferred embodiment, functional biochar can be obtained by carbonizing, activating, deoiling, reducing and drying wetland plants 6 (cattail and calamus) grown in the alternate vertical flow constructed wetland.

During the growth process of plants, heavy metals are continuously absorbed, and plant biomass that absorbs heavy metals is burned into activated carbon, so heavy metals are embedded in plant carbon fibers as extremely stable connection, rather than bonded to the carbon structure. The load of heavy metals in biochar far exceeds the existing load mode, and biochar has higher electric capacity and photocatalytic ability.

In a preferred embodiment, one of rhamnolipid, aspartic acid or (poly)aspartic acid or a combination thereof, preferably the combination of rhamnolipid and (poly)aspartic acid, is added during the growth process of wetland plants 6, to promote the enrichment of heavy metals in plants, so that the concentration of heavy metals in the plant could be as high as possible. Rhamnolipid and (poly)aspartic acid have good biocompatibility and biodegradability. As water-soluble biosurfactant, rhamnolipid can promote the dissolution of heavy metals adsorbed by soil, etc. through emulsification and solubilization, which is beneficial to plant absorption. (Poly)aspartic acid can chelate and activate heavy metal ions, thus can dissolve the heavy metals adsorbed by soil, etc., and at the same time it also can effectively promote plant growth, which is different from other chelating agents. By using rhamnolipid and (poly) aspartic acid mixed in a set ratio, heavy metals can be effectively enriched.

Preferably, the concentration of rhamnolipid in basin water to be treated is 1-20 mg/L, and the concentration of (poly)aspartic acid in basin water to be treated is 1-25 mg/L.

In a preferred embodiment of the present invention, the second layer of filler is laid at 500-1000 cm, and the second layer of filler 13 is a mixed filler of soil, natural zeolite and limestone, with mixing ratio of 1:(2-3):(0.5-1), and preferably 1:2:0.5.

Zeolite is a water-containing porous aluminosilicate with a crystal structure mainly composed of (SiO) tetrahedron. The overall framework of the zeolite molecule is formed by $Al^{3+}$ and $Si^{4+}$ as framework ions and oxygen atoms together, and part of $Si^{4+}$ is replaced by $Al^{3+}$, resulting in excess negative charge. At the same time, there are cavities and channels in the zeolite framework with certain pore size, which determines its adsorption and ion exchange properties. Zeolite adsorbs ammonia nitrogen and adsorbs and fixes heavy metals with greater advantage than other ore raw materials.

Limestone also has more pore structures, so it can effectively adsorb heavy metals. At the same time, the acidity and alkalinity of water can be effectively regulated by limestone, and it play an important role in the growth of plants in the upper filler and the reproduction of microorganisms in water (phosphorus-accumulating bacteria multiply at a pH value of 5-9, and nitrifying bacteria and denitrifying bacteria multiply at a pH value of 6.0-8.5). Meanwhile, limestone can strongly adsorb fluoride ions, which effectively reducing the content of fluorine in water.

The soil also provides support for wetland plants 6 in the alternate vertical flow constructed wetland. At the same time, studies have shown that due to the presence of clay minerals, oxides and organic matters in soil, soil has a tendency to enrich heavy metals, which making its ability of adsorption heavy metal ions not to be underestimated.

After a lot of experimental research, the mixing ratio of soil, natural zeolite and limestone in the second layer of filler 13 is 1:(2-3):(0.5-1). Within this range, the adsorption and fixation of most heavy metals and the adjustment the pH value of water can be realized. If the proportion of soil increases, the adsorption capacity of heavy metals decreases due to the weaker adsorption effect of soil to heavy metals than those of natural zeolite and limestone. On the contrary, nutrient reserves of plant growth may be affected. If the proportion of the natural zeolite increases, the adsorption of heavy metals increases, and correspondingly the amount of soil or limestone decreases, which also has a threat to plant growth or the regulation of the pH value of water. Similarly, the increase of the proportion of limestone is beneficial to the adjustment of the pH value of water, but the effect of other components is reduced accordingly. On the contrary, the pH value of water cannot be adjusted quickly and effectively, thereby affecting the functional activities of microorganisms.

In a further preferred embodiment, the particle size of the filler in the second layer of filler 13 is 0.08-0.1 cm, which is equal to or lower than that of the functional biochar in the first layer of filler 12, and is equal to or higher than the particle size in the third layer of filler 14. This particle size range is chosen under considering the coordination of gas circulation and total metal adsorption. When the particle size is less than 0.08 cm, although the adsorption of heavy metals is promoted, it is not beneficial to the phosphorus accumulation process of the phosphorus-accumulating bacteria placed in the third layer of filler 14 due to increased packing density and poor air circulation. When the particle size is higher than 0.1 cm, air circulation is promoted, but corresponding heavy metal adsorption capacity is significantly reduced compared to that with particle size of 0.08 cm.

In a preferred embodiment of the present invention, the third layer of filler 14 is laid at 1000-1500 cm, and the third layer of filler 14 is a mixed filler of fly ash molecular sieve, Flory diatomaceous earth and biochar with the mixing ratio of 1:(3-4):(1-1.5), and preferably 1:3:1.

In the present invention, three kinds of porous fillers, namely fly ash molecular sieve, Flory diatomaceous earth and biochar are used to adsorb heavy metals in the deep layer of the alternate vertical flow constructed wetland. The common feature of these porous fillers is the high porosity, which is convenient for the biofilm formation of microorganisms. Wherein, fly ash is used as a molecular sieve, based on the fact that the main components of fly ash are similar to those of molecular sieves. Fly ash is currently treated as waste, because it contains heavy metal ions, such as Cr, Hg, As and Pb, and will pollute air, water, soil, and so on. If fly ash is used as molecular sieve, its cation exchange characteristics and pore structure are beneficial to achieve the adsorption of heavy metals, thereby the source of pollution is used effectively.

Biochar with large surface area also has excellent heavy metal adsorption capacity.

Compared with ordinary diatomaceous earth, Flory diatomaceous earth has larger pore volume, larger specific surface area, and stronger adsorption of heavy metals and organic pollutants. In particular, Flory diatomaceous earth has a depth effect, that is, in deep filtration, the separation process only occurs in the "inside" of the medium, and some of the relatively small impurity particles that pass through the surface of Flory diatomaceous earth are blocked by the tortuous micropore structure and the finer pores inside diatomaceous earth. When the particles hit the wall of the channel, it is possible to escape from the flow. The nature of Flory diatomaceous earth is beneficial to the long-term retention of bacterial microorganisms in this area, which facilitates the placement of microorganisms.

Since the fly ash molecular sieve, Flory diatomaceous earth and biochar have different adsorption advantages for different heavy metals, the mixing ratio of fly ash molecular sieve, Flory diatomaceous earth and biochar is 1:(3-4):(1-1.5), which is beneficial to the placement of microorganisms, thereby improving the adsorption of various heavy metal ions.

In a preferred embodiment, the particle sizes of fly ash molecular sieve, Flory diatomaceous earth and biochar are 0.05-0.08 cm. Due to the high porosity of the above three fillers, within this small particle size range, it is beneficial to the adsorption of heavy metal ions and the biofilm formation of microorganisms.

In a preferred embodiment, phosphorus-accumulating bacteria is added in the third layer of filler 14 to reduce the phosphorus content of basin water to be purified because of its phosphorus-accumulating ability. Said phosphorus-accumulating bacteria are selected from one or more of *Acinetobacter*, *Aeromonas* and *Pseudomonas*, and preferably *Pseudomona alcaligenes*.

Under aerobic conditions, free oxygen is used as the electron acceptor by phosphorus-accumulating bacteria to oxidize β-hydroxy butyric acid (PHB) stored in cells, and the energy generated by this reaction is used to excessively take up phosphate from water to synthesize the high-energy substance adenosine triphosphate (ATP), wherein a part of which is provided for bacterial synthesis and life-sustaining activities, and another part of which is used to synthesize polyphosphate which accumulating in bacterial cells. Under anaerobic conditions, the phosphorus-accumulating bacteria decompose the polyphosphate in the body and produce ATP. Phosphorus is released by the phosphorus-accumulating bacteria under anaerobic conditions. The amount of aerobic phosphorus accumulating is greater than that of the anaerobic phosphorus releasing, thus the phosphorus content of basin water can be effectively controlled by inputting the phosphorus-accumulating bacteria.

In a preferred embodiment of the present invention, the fourth layer of filler 15 is laid at 1500-2000 cm, the fourth layer of filler 15 is a mixed filler of pebbles and biochar with the mixing weight ratio of 1:(1-2), and preferably 1:1. Pebbles also have the ability to adsorb heavy metals, and are cooperated with biochar to synergistically adsorb heavy metals.

In a further preferred embodiment, the particle size of the filler in the fourth layer of filler 15 is 0.30-0.50 cm. Larger gaps will be formed between the fillers due to their larger particle size, which facilitates the circulation of the introduced microorganisms. Because the particle size of the filler in the third layer of filler 14 is relatively smaller, microorganisms are restricted to enter the fourth layer of filler 15 to a certain extent. If the particle size of the filler in the fourth layer of filler 15 is also reduced, the phosphorus-accumulating bacteria cannot effectively travel to and from the third and fourth layers of filler, which is not beneficial to the process of phosphorus-accumulating and releasing.

In a further preferred embodiment, the fourth layer of filler 15 is an anoxic or anaerobic environment, and anaerobic denitrifying bacteria, preferably heterotrophic anaerobic denitrifying bacteria, are added to the fourth layer of filler 15.

$NO_3^-$ can be gradually converted to $NO_2^-$, NO, $N_2O$ and $N_2$ by the denitrifying bacteria, and gets out of the water system, thereby achieving the purpose of denitrification. Although certain nitrifying bacteria and denitrifying bacteria are present in basin water, some denitrifying bacteria are added in basin water in present invention to further improve the denitrification efficiency.

In a further preferred embodiment, phosphorus-accumulating bacteria are added to the fourth layer of filler 15. Phosphorus is released by the phosphorus-accumulating bacteria under anaerobic conditions, and the phosphorus releasing under this condition will promote better phosphorus accumulation under aerobic conditions in the third layer of filler.

In order to achieve and maintain the anaerobic or anaerobic environment in the fourth layer of filler, a polar polymer film, such as polyaniline film, is filled between the third layer of filler 14 and the fourth layer of filler 15. The polar polymer polyaniline film has unique functions of water permeability and air impermeability. Therefore, water and microorganisms are allowed to circulate between the third layer of filler 14 and the fourth layer of filler 15, while the upper layer of oxygen-containing gas is prevented from entering the fourth layer of filler 15, thereby the living activities of anaerobic denitrifying bacteria and phosphorus-accumulating bacteria in this area can be ensured.

Appropriate amount of phosphorus and nitrogen fertilizers are required for the growth of plants. The phosphorus in the phosphorus fertilizer and the nitrogen in the nitrogen fertilizer are absorbed by the plants in the form of acid radical ions. However, only a part of the fertilizer applied to soil each year is absorbed by the crops of the season, and the rest is fixed by soil to form large amount of acidic salt deposits, causing soil compaction. Basin water may be rich in nitrogen and phosphorus, and both exist in the form of organic phosphorus and organic nitrogen, or inorganic phosphorus and inorganic nitrogen. Organic phosphorus and organic nitrogen are decomposed into inorganic phosphorus, inorganic nitrogen and short carbon chains in the alternate vertical flow constructed wetland. The formed inorganic phosphorus and inorganic nitrogen mostly exist in water in the form of acid radical ions. Once the contents exceed the plant's requirements, the soil condition will definitely be affected, and acidic salt deposition and soil compaction will also occur. Therefore, after extensive research, the aerobic areas (the first, second and third layers of filler) and the anaerobic area (the fourth layer of filler) are set up in the alternate vertical flow constructed wetland, and phosphorus-accumulating bacteria and denitrifying bacteria are add, thereby effectively solving the problem of excessive nitrogen and phosphorus.

The thicknesses of the first layer of filler 12, the second layer of filler 13, the third layer of filler 14 and the fourth layer of filler 15 are all 500 cm, and the total thickness of the fillers is 2000 cm; and said thickness is the most preferable to effectively implement the function of each filler layer. The thickness of the first layer of filler 12 is from 100 to 700 cm, the thickness of the second layer of filler 13 is from 300 to 700 cm, the thickness of the third layer of filler 14 is from 200 to 600 cm, and the thickness of the fourth layer of filler 15 is from 100 to 600 cm.

In the present invention, the alternate vertical flow constructed wetland 3 is equipped with inlet pipes and outlet pipes on both sides along its length, and each of inlet pipe and outlet pipe is equipped with control valves. The inlet pipe includes a first inlet pipe 16 to feed water into the first layer of filler 12 and a second inlet pipe 18 to feed water into the fourth layer of filler 15, and the outlet pipe includes a first outlet pipe 17 to collect water from the first layer of filler 12 and a second outlet pipe 19 to collect water from the fourth layer of filler 15, both of the inlet pipes are located on the same side of the alternate vertical flow constructed wetland 3, and both of the outlet pipes are located on the other side of the alternate vertical flow constructed wetland 3.

When the valves of the first inlet pipe 16 and the second outlet pipe 19 are opened at the same time, the constructed wetland is in the vertical downflow operation mode. When the valves of the second inlet pipe 18 and the first outlet pipe 17 are opened at the same time, the constructed wetland is in the vertical upflow operation mode. When the valves of the first inlet pipe 16 and the first outlet pipe 17 are opened at the same time, the constructed wetland is in the submerged flow operation mode.

The different operation modes of the alternate vertical flow constructed wetland 3 have their own advantages and disadvantages. The subsurface flow operation mode has a better treatment effect on heavy metals and suspended matters in water, but the treatment effect on nitrogen, phosphorus and organic matters is not as good as the vertical downflow operation mode or the vertical upflow operation mode. Compared with the submerged flow operation mode, the contact area of basin water and air can be greatly increased by the vertical downflow operation mode or the vertical upflow operation mode, which is beneficial to the transmission of oxygen and the improvement of nitrogen and phosphorus purification treatment. However, the construction requirements of the vertical flow constructed wetland are high, and the single mode long-term operation is likely to cause serious blockage in the local area of the filler layer, thereby affecting the effective purification In the present invention, multiple operation modes can be performed by the alternate vertical flow constructed wetland 3, including the vertical downflow operation mode, the vertical upflow operation mode and the submerged flow operation mode, thereby avoiding the decline in the purification capacity of the constructed wetland caused by a single mode of long-term operation, and extending the effective period of purification, and reducing the maintenance cost of the device.

A carbon source is required with the growth of microorganisms, especially short chain carbon source is more beneficial to the absorption and utilization of microorganisms. However, the content of short chain carbons in basin water is small, and the growth and reproduction of microorganisms placed in the alternate vertical flow constructed wetlands are bound to be affected.

Therefore, in the present invention, an acidification tank 1 and an aeration tank 2 are constructed at 4-10 m from basin revetment in extremely water-scarce areas to provide microorganisms with nutrients. Wherein, the acidification tank 1, the aeration tank 2 and the alternate vertical flow constructed wetland are connected in sequence.

The duckweed and algae salvaged from the basin are crushed, acidified and digested in the acidification tank 1, and then the supernatant is transported into the aeration tank 2.

The supernatant from the acidification tank 1 is received by the aeration tank 2, and organic matters in the supernatant are degraded, such as organic matters with long carbon chains are degraded into organic matters with short carbon chains, thereafter the degraded supernatant is fed into the alternate vertical flow constructed wetland 3 to provide microorganisms with carbon source.

In a preferred embodiment, the acidification tank 1 is a container with an interlayer. There is a heat transfer medium in the interlayer, so the temperature of the heat transfer medium is measured by the temperature probe 5 of the temperature control device 4 to control the temperature in the acidification tank 1.

In a preferred embodiment, a sludge discharge hole 7 is set at the bottom of the acidification tank 1. Because duckweed or algae in basin water is used as the raw material of nutrients for bacterial growth, sludge in basin water is inevitably brought into the acidification tank 1. The setting of the sludge discharge hole 7 is beneficial to the discharge of sludge and reduces the invalid occupation of the space in the acidification tank 1.

In a preferred embodiment, the acidification tank 1 is equipped with an agitator 8, so that duckweed or algae can be crushed to speed up the acidification and digestion process.

In a preferred embodiment, when the COD of the supernatant of the acidification tank 1 is higher than 200 mg/L, it is considered that the decomposition degree in the acidification tank 1 is good.

In a preferred embodiment, an aeration disk 10 is set at the lower part of the aeration tank 2, and an oxygen-containing fluid is introduced through the aeration disk 10 into the aeration tank 2. Furthermore, the oxygen-containing fluid is nano-bubble water or the aqueous solution containing tiny bubbles with a size of 100-500 nm and dissolved oxygen amount of 10-25 mg/L.

Due to the small size and the large specific surface area of the bubbles in the nano-bubble water, they can show characteristics different from ordinary bubbles. For example, the residence time of the bubbles in the device is long due to their small volume. When the bubbles slow rise, both the zeta potential and the specific surface area increase (when ordinary bubbles rise, their volume increases and their specific surface area decreases; while the specific surface area of nano-bubbles increases during they rise, due to a self-pressurizing effect of the internal gas of nano-bubbles because of the surface tension). Active oxygen radicals, such as hydroxyl radicals are generated after the bubbles collapse, thereby efficiently degrading or mineralizing organic matters with long carbon chains in water; and the high temperature generated at the moment of collapse is also beneficial to the degradation of organic matters with long carbon chains.

In a preferred embodiment, the diameters of the pores on the aeration disk 10 is nano-scale, that is, the aeration disk 10 is a nano-aeration disk, and it can be set to further ensure oxygen entering the aeration tank 2 to be nano-sized bubbles.

In a preferred embodiment, a secondary sludge discharge hole 9 is set at the bottom of the aeration tank to further remove the sludge brought by basin water, to avoid blocking the pipeline when transporting to the alternate vertical flow constructed wetland, or to avoid blocking the pore of the aeration disk 10 in the aeration tank 2.

In a further preferred embodiment, the aeration disk 10 is connected to a nano-aerator 11 in sequence through a pipeline. The oxygen-containing fluid is supplied through the nano-aerator 11 to the aeration disk 10.

In the present invention, organic matters with long carbon chains can be effectively degraded through the aeration tank 2, so that the average molecular weight of organic matters in water from the aeration tank 2 is lower than 308.24 Da, and preferably lower than 254.50 Da.

In a further preferred embodiment, microorganisms are added into the aeration tank 2, and the microorganisms is *Enterobacter* sp. Organic matters with long carbon chains are used by the bacteria of *Enterobacter* sp. as carbon source for growth, so its addition can promote the degradation of organic matters with long carbon chains.

Another object of the present invention is to provide a method for controlling pollutants in basin water used for irrigating farmland in extremely water-scarce areas, so as to effectively control the content of pollutants in basin water fed into the farmland. The method includes providing an alternate vertical flow constructed wetland 4-10 m far from basin revetment in extremely water-scarce areas, feeding basin water into the alternate vertical flow constructed wetland, and also into one or more layers of fillers laid in the alternate vertical flow constructed wetland to degrade or remove pollutants, thereafter transporting the treated basin water into the farmland.

In a preferred embodiment of the present invention, the alternate vertical flow constructed wetland is provided with four layers of fillers from top to bottom:

the first layer of filler adsorbs heavy metals and degrades organic matters;

the second layer of filler adsorbs and fixes heavy metals;

the third layer of filler adsorbs heavy metals, and phosphorus-accumulating bacteria is added in this area to reduce the phosphorus content of basin water to be purified because of its phosphorus-accumulation capacity;

the fourth layer of filler adsorbs heavy metals, and phosphorus-accumulating bacteria are allowed to dephosphorize in this area by constructing anaerobic environment, so its phosphorus-accumulation ability in the third layer of filler is promoted. Anaerobic denitrifying bacteria are added to reduce the nitrogen content of basin water to be purified.

Specifically, the first layer of filler is a mixed filler of soil and functional biochar. The mixing ratio is 3:(6-8), and preferably 3:7, the particle size of the filler is 0.10-0.30 cm, and the thickness of the filler is from 100 to 700 cm.

The second layer of filler is a mixed filler of soil, natural zeolite and limestone. The mixing ratio is 1:(2-3):(0.5-1), and preferably 1:2:0.5, the particle size of the filler is 0.08-0.1 cm, and the thickness of the filler is from 300 to 700 cm.

The third layer of filler is a mixed filler of fly ash molecular sieve, Flory diatomaceous earth and biochar The mixing ratio is 1:(3-4):(1-1.5), and preferably 1:3:1, the particle size of the filler is 0.05-0.08 cm, and the thickness of the filler is from 200 to 600 cm.

The fourth layer of filler is a mixed filler of pebbles and biochar. The mixing ratio is 1:(1-2), and preferably 1:1, and the particle size of the filler is 0.30-0.50 cm, and the thickness of the filler is from 100 to 600 cm.

In the present invention, the ratio of different materials in each filler layer is based on the weight thereof.

In a further preferred embodiment, wetland plants are planted on the alternate vertical flow constructed wetland (on the first layer of filler), said wetland plants are cattail and calamus.

In a preferred embodiment, a polar polymer film, such as polyaniline film, is filled between the third layer of filler and the fourth layer of filler. Phosphorus-accumulating bacteria are added to the third layer of filler, and denitrifying bacteria and phosphorus-accumulating bacteria are added to the fourth layer of filler.

In the present invention, the alternate vertical flow constructed wetland is equipped with inlet pipes and outlet pipes on both sides along its length, and each inlet pipe and outlet pipe are equipped with control valves. The inlet pipe includes a first inlet pipe to feed water into the first layer of filler and a second inlet pipe to feed water into the fourth layer of filler, and the outlet pipe includes a first outlet pipe to collect water from the first layer of filler and a second outlet pipe to collect water from the fourth layer of filler, both of the inlet pipes are located on the same side of the alternate vertical flow constructed wetland, both of the two outlet pipes are located on the other side of the alternate vertical flow constructed wetland.

When the valves of the first inlet pipe and the second outlet pipe are opened at the same time, the constructed wetland is in the vertical downflow operation mode. When the valves of the second inlet pipe and the first outlet pipe are opened at the same time, the constructed wetland is in the vertical upflow operation mode. When the valves of the first inlet pipe and the first outlet pipe are opened at the same time, the constructed wetland is in the submerged flow operation mode.

In the present invention, a single operation mode or an alternate operation mode of a vertical downflow operation mode, a vertical upflow operation mode, or a submerged flow operation mode can be performed during the operation of the alternate vertical flow artificial wetland, preferably the alternate operation mode, more preferably the vertical downflow operation mode and the submerged flow operation mode are alternately operated.

In the present invention, the diversity of water treatment methods is increased through the setting of above multiple operation modes of the alternate vertical flow constructed wetlands.

In order to improve the purification effect of basin water, the method further includes: providing an acidification tank and an aeration tank connected in sequence with the alternate vertical flow constructed wetland, which are 4-10 m far from basin revetment in extremely water-scarce areas, salvaging duckweed and algae in the basin, then acidizing and digesting them in the acidification tank, importing the supernatant from the acidification tank into the aeration tank for further degradation, thereafter mixing water from the aeration tank with basin water and importing them into the alternate vertical flow constructed wetland.

In the present invention, the supernatant from the acidification tank is received by the aeration tank, and organic matters with long carbon chains in the supernatant are degraded to obtain short chain hydrocarbons, which is convenient for microorganisms in the constructed wetland to obtain a carbon source.

In a preferred embodiment, the ratio of the amount of the water from the aeration tank to that of basin water is 1:1, and preferably is 1:2-1:50, that is, the amount of basin water fed into the alternate vertical flow constructed wetland is not less than that of the water from the aeration tank, thereby improving the microbial activity in the alternate vertical flow constructed wetland and balancing basin water treatment efficiency.

In present invention, in addition to constructing the acidification tank, the aeration tank and the alternate vertical flow constructed wetland, basin water in the river is also pretreated by inoculating denitrifying bacteria, which is preferably aerobic denitrifying bacteria, such as *Alicaligenes faecalis* or *Thiosphaera pantotropha*.

Preferably, the concentration of denitrifying bacteria in basin water of the river is 50-100 billion/g. It only needs to be inoculated once when basin water is used for irrigation. Basin water to be treated will inevitably be further purified by the addition of denitrifying bacteria, especially aerobic denitrifying bacteria. Meanwhile, the synergistic effect of aerobic denitrifying bacteria and anaerobic denitrifying bacteria added in the alternate vertical flow constructed wetland will promote water purification.

In the present invention, wetland plants such as cattail and calamus, planted in the alternate vertical flow constructed wetland, has extremely excellent enrichment effect on heavy metals, so can be used to prepare functional biochar, which may be used as a filler for the alternate vertical flow constructed wetlands.

In a preferred embodiment of the present invention, the preparation of functional biochar includes the following steps:

step 1, crushing the plants and carbonizing to obtain activated carbon;

step 2, activating the activated carbon to obtain activated carbon after activation;

step 3, reducing the activated carbon after activation to obtain functional biochar.

In step 1, the whole plant is crushed to particles with a length of 3-5 mm as needed.

Argon is filled in a heating vessel, such as a tube muffle furnace, to obtain an inert environment. After temperature of 1200° C. is reached in the heating vessel, in which the crushed plant particles are fed, thereafter 1200° C. is maintained for 120 min, and then the temperature is reduced from 1200° C. to 20° C. within 200 min, thereby carbonizing the biomass.

In step 2, the activated carbon is washed with distilled water until the water is clear after washing. In order to activate, 30-50 wt. % zinc chloride is added to the washed activated carbon until the liquid level is higher than the activated carbon, and the mixture is stirred, microwave radiated for a set time, and then soaked at 25° C. overnight. The activated carbon after activation is washed to neutral, dried and ready for use.

Bio-oil produced by carbonization in step 1 is detached from the internal pores of the activated carbon through the activation, thereby preventing bio-oil from clogging the internal pores of the activated carbon, and the decrease of the adsorption and photocatalytic effects.

During the activation, a microwave of 300 W-700 W is used to radiate for 20-30 min.

In step 3, the activated carbon after activation is dried, and a solution of sodium borohydride is added dropwise at a low temperature to reduce the metal ions in the activated carbon, for example, ferrous ions is reduced to iron at zero valence. Preferably, the activation reaction is promoted by shaking at 100-140 rpm with a shaker. The concentration of sodium borohydride solution is 10-30 mmol/L.

The activated carbon is washed with distilled water and dried. After cooling to room temperature, the activated carbon after reduction is filled into a container, sealed, and heated at 180-680° C. in an oven for 10-60 minutes, and then cooled to room temperature to give functional biochar (that is, in situ self-reduction supported activated carbon).

During the growth process of plants, heavy metals are continuously absorbed, and plant biomass that absorbs heavy metals is burned into activated carbon, so heavy metals are embedded in plant carbon fibers as extremely stable connection, rather than bonded to the carbon structure. The load of heavy metals in biochar far exceeds the existing load mode. After the biochar is activated, the ash tar on its surface is removed, and the metal ions are exposed and then is reduced by sodium borohydride, thereby obtaining activated carbon loaded with heavy metals, which not only has inherent performances of activated carbon, such as regulating urban hydraulics, increasing soil fertility, maintaining nutrient and improving microbial habitat, but also has the functions of electric capacity and catalysis.

EXAMPLE

Example 1

As shown in FIG. 1, simulate to set up a device for controlling pollutants in basin water used for irrigating farmland in extremely water-scarce areas, and use the device to control pollutants. Provide an acidification tank, an aeration tank and an alternate vertical flow constructed wetland connected in sequence. The duckweed and algae salvaged in basin water are crushed, acidified and digested in the acidification tank. After the COD of the supernatant of the acidification tank is higher than 200 mg/L, the supernatant from the acidification tank is transported into the aeration tank. In the aeration tank, long chain organic matters are degraded into organic matters with short carbon chains by microorganisms Enterobacter sp. and nano-bubble water, and the amount of dissolved oxygen in the aeration tank is maintained at 4-6 mg/L. Water from the aeration tank is mixed with basin water at a ratio of 1:15, and then is fed into the alternate vertical flow constructed wetland, which is in the vertical downflow operation mode.

There are four layers of fillers in the alternate vertical flow constructed wetland. The first layer of filler at 0-500 cm is a mixed filler of soil and functional biochar, wherein the mixing ratio is 3:7 and the particle size of the filler is 0.10-0.30 cm, and the wetland plants, cattail and calamus, are planted on it; the second layer of filler at 500-1000 cm is a mixed filler of soil, natural zeolite and limestone, wherein the mixing ratio is 1:2:0.5, and the particle size of the filler is 0.08-0.1 cm; the third layer of filler at 1000-1500 cm is added phosphorus-accumulating bacteria *Pseudomona alcaligenes*, and the third layer of filler is a mixed filler of fly ash molecular sieve (Henan Mingze Environmental Protection Technology Co., Ltd., 13X molecular sieve), Flory diatomaceous earth and biochar, wherein the mixing ratio is 1:3:1 and the particle size of the filler is 0.05-0.08 cm; the fourth layer of filler at 1500-2000 cm is added anaerobic denitrifying bacteria and phosphorus accumulating bacteria *Pseudomona alcaligenes*, and the fourth layer of filler is a mixed filler of pebbles and biochar, wherein the mixing ratio is 1:1 and the particle size of the filler is 0.30-0.50 cm. Between the third and the fourth layers of filler is filled a polar polyaniline film (obtained according to "Wang Hui. Electrochemical synthesis of polyaniline film photoelectric properties [J]. Journal of Xi'an Jiaotong University, 1999, (08): 107-108")

Example 2-18

Implementing the method similar to Example 1, with the differences are shown in Table 1 below.

TABLE 1

| Example number | Differences from Example 1 (the substance and order related to the ratio is the same as those in Example 1) |
|---|---|
| Example 2 | The filler in first layer is soil |
| Example 3 | The mixing ratio in the first layer of filler is 1:1 |
| Example 4 | The particle size of the filler in first layer is 0.01-0.08 cm |
| Example 5 | The particle size of the filler in first layer is 5-30 mm |
| Example 6 | The second layer of filler is soil and limestone in original proportion |
| Example 7 | The second layer of filler is of soil and natural zeolite in original proportion |
| Example 8 | The mixing ratio in the second layer of filler is 1:1:2 |
| Example 9 | The particle size of the filler in second layer is 0.01-0.05 cm |
| Example 10 | The particle size of the filler in second layer is 1-10 mm |
| Example 11 | The third layer of filler is fly ash molecular sieve and biochar in original proportion |
| Example 12 | The third layer of filler is fly ash molecular sieve and Flory diatomaceous earth in original proportion |
| Example 13 | The mixing ratio in the third layer of filler is 1:1:1 |
| Example 14 | The particle size of the filler in third layer is 0.005-0.03 cm |
| Example 15 | The filler in fourth layer is pebbles |
| Example 16 | The particle size of the filler in fourth layer is 0.001-0.30 cm |
| Example 17 | No phosphorus-accumulating bacteria is fed in the third and the fourth layers of filler |
| Example 18 | No anaerobic denitrifying bacteria is fed in the fourth layer of filler |

Experimental Example

The effects of the pollutant control methods in Examples 1-18 are evaluated by measuring the content of heavy metals, $COD_{Cr}$, total phosphorus, total nitrogen and the pH value in the water before and after the treatment. The results are shown in Table 2.

The water used for evaluation is collected from river water. $SnCl_4$, $Zn(NO_3)_2$, biogas slurry, $Na_3PO_4$ and $NaNO_3$ are added to water, so that the concentration of Sn in water is 7.23 mg/L, the concentration of Zn is 5.88 mg/L, and the total content of P is 3.36 mg/L, the total content of N is 4.57 mg/L, the concentration of $COD_{Cr}$ is 124 mg/L, and the pH value is 7.28. The treated water is fed directly into the constructed wetland with the inflowing rate of 2.5 L/min and the outflowing rate is 2.5 L/min. The treatment time is 12 h, and the water quality is measured after 12 h.

TABLE 2

| Example number | Sn (mg/L) | Zn (mg/L) | COD (mg/L) | Total P (mg/L) | Total N (mg/L) | pH |
|---|---|---|---|---|---|---|
| Example 1 | 1.16 | 1.61 | 71 | 2.15 | 2.47 | 7.16 |
| Example 2 | 1.41 | 1.99 | 162 | 2.53 | 2.66 | 7.14 |
| Example 3 | 1.21 | 1.72 | 79 | 2.29 | 2.80 | 7.23 |
| Example 4 | 0.91 | 1.54 | 65 | 2.74 | 2.99 | 6.94 |
| Example 5 | 1.29 | 1.78 | 101 | 2.23 | 2.62 | 7.08 |
| Example 6 | 2.52 | 2.79 | 78 | 2.32 | 2.31 | 7.17 |
| Example 7 | 0.74 | 1.30 | 83 | 2.96 | 3.21 | 6.22 |
| Example 8 | 1.74 | 2.44 | 75 | 2.27 | 2.56 | 7.28 |
| Example 9 | 0.48 | 1.03 | 86 | 2.76 | 3.03 | 7.11 |
| Example 10 | 1.25 | 1.90 | 78 | 2.51 | 2.70 | 7.18 |
| Example 11 | 1.28 | 1.67 | 80 | 2.81 | 2.93 | 7.13 |
| Example 12 | 1.48 | 1.55 | 69 | 2.49 | 2.63 | 7.15 |
| Example 13 | 1.35 | 1.73 | 76 | 2.69 | 2.79 | 7.17 |
| Example 14 | 1.04 | 1.47 | 68 | 2.40 | 2.52 | 7.23 |
| Example 15 | 1.50 | 1.79 | 73 | 2.43 | 2.60 | 7.14 |
| Example 16 | 1.44 | 1.62 | 76 | 2.55 | 2.81 | 7.17 |
| Example 17 | 1.25 | 1.71 | 92 | 3.37 | 2.99 | 7.37 |
| Example 18 | 1.11 | 1.60 | 97 | 2.89 | 3.91 | 7.24 |

As can be seen from Table 2, the decrease in the proportion of functional biochar in the first layer of filler mainly affects the adsorption of heavy metals and the reduction of COD values. When the size of the filler becomes smaller, it is beneficial to the adsorption of heavy metals, because it may affect the air entering the water, thereby reducing the ability of microorganisms to dephosphorize and denitrify. When the size of the filler becomes larger, the dephosphorization and the denitrification of microorganisms are promoted, thus the content of phosphorus and nitrogen decreases, but it has certain adverse effect on heavy metal adsorption.

The decrease in the proportion of natural zeolite in the second layer of filler mainly affects the adsorption and fixation of heavy metals, which causing higher content of heavy metals in the treated system. The pH value in the system is affected by the decrease in the proportion of limestone, and the efficiency of the dephosphorization and the denitrification of microorganisms is reduced, causing higher contents of total nitrogen and total phosphorus in the water. The decrease in the particle size of the filler can significantly improve the adsorption of heavy metals, but it is unfavorable for the regulation of COD, total nitrogen and total phosphorus due to the obstruction of gas flow.

In the third layer of filler, Flory diatomaceous earth is beneficial to microorganisms and its dephosphorization and denitrification, and thus the effect of dephosphorization and denitrification decreases as the proportion of Flory diatomaceous earth decreases. The removal of biochar with excellent adsorption performance has certain impact on the level of heavy metals. And the adsorption of heavy metals can be significantly improved by decreasing the particle size of filler.

In the fourth layer of filler, the level of heavy metals is slightly increased by replacing activated carbon with pebbles, since activated carbon has better adsorption to heavy metals than pebbles. The adsorption performance can be enhanced by decreasing the particle size of the filler, but close packing is not beneficial to the dephosphorization and the denitrification of microorganisms, therefore, the total phosphorus and total nitrogen levels increase slightly as the particle size of the filler in fourth layer decreases.

Anaerobic denitrifying bacteria and phosphorus-accumulating bacteria have the functions of denitrification and dephosphorization, respectively. For the above reason, the total nitrogen and total phosphorus in the water body are significantly increased when both of them are not added to the water.

In the description of the present invention, it should be noted that the orientation or positional relationship indicated by the terms "over", "under", "inner", "outer", "front" and "rear" is based on the working state of the present invention. and is only for the convenience of describing the present invention and simplifying the description, rather than indicating or implying that the device or element referred to must have a specific orientation, be constructed and operated in a specific orientation, and therefore cannot be construed as limiting the present invention.

The present invention has been described in detail with reference to specific embodiments and exemplary examples, but these descriptions should not be construed as limiting the present invention. Those skilled in the art should understand that, without departing from the spirit and scope of the present invention, various equivalent replacements, modifications, or improvements can be made to the technical solution and its implementation of the present invention, all of which fall within the scope of the present invention. The protection scope of the present invention is subject to the appended claims.

What is claimed is:

1. A device for controlling pollutants in basin water used for irrigating farmland, characterized in that, the device includes an alternate vertical flow constructed wetland (3), which is constructed at a set distance far from a basin revetment, and basin water to be purified is fed into the alternate vertical flow constructed wetland (3), and also into one or more layers of fillers laid in the alternate vertical flow constructed wetland (3) to degrade or remove pollutants;

wherein the alternate vertical flow constructed wetland (3) is provided with four layers of fillers from top to bottom:
the first layer of filler (12) is a mixed filler of soil and functional biochar, which adsorbs heavy metals and degrades organic matters;
the second layer of filler (13) is a mixed filler of soil, natural zeolite and limestone, which adsorbs and fixes heavy metals;

the third layer of filler (14) is a mixed filler of fly ash molecular sieve, Flory diatomaceous earth and biochar, which adsorbs heavy metals, and optionally phosphorus-accumulating bacteria is added in this area to reduce the phosphorus content of basin water to be purified;

the fourth layer of filler (15) is a mixed filler of pebbles and biochar, which adsorbs heavy metals, and optionally phosphorus-accumulating bacteria are allowed to release phosphorus in this area by constructing an anaerobic environment.

2. The device according to claim 1, characterized in that, the mixing weight ratio of soil and functional biochar in the first layer of filler (12) is 3:(6-8), and optionally the particle size of the filler is 0.10-0.30 cm;

the mixing weight ratio of soil, natural zeolite and limestone in the second layer of filler (13) is 1:(2-3):(0.5-1), and optionally the particle size of the filler is 0.08-0.1 cm;

the mixing weight ratio of fly ash molecular sieve, Flory diatomaceous earth and biochar in the third layer of filler (14) is 1:(3-4):(1-1.5), and optionally the particle size of the filler is 0.05-0.08 cm;

the mixing weight ratio of pebbles and biochar in the fourth layer of filler is (15):1:(1-2), and optionally the particle size of the filler is 0.30-0.50 cm.

3. The device according to claim 1, characterized in that, a polar polymer, optionally polyaniline film, is filled between the third layer of filler (14) and the fourth layer of filler (15), optionally an anaerobic environment is formed in the area where the fourth layer of filler (15) is located;

anaerobic denitrifying bacteria are added to the fourth layer of filler (15);

phosphorus-accumulating bacteria are added to the fourth layer of filler (15).

4. The device according to claim 1, characterized in that, the alternate vertical flow constructed wetland (3) is equipped with an inlet pipe and an outlet pipe on both sides along its length, and each inlet pipe and outlet pipe are equipped with control valves;

the inlet pipe includes a first inlet pipe (16) to feed water into the first layer of filler (12) and a second inlet pipe (18) to feed water into the fourth layer of filler (15), and the outlet pipe includes a first outlet pipe (17) to collect water from the first layer of filler (12) and a second outlet pipe (19) to collect water from the fourth layer of filler (15), both of the inlet pipes are located on the same side of the alternate vertical flow constructed wetland (3), and both of the outlet pipes are located on the other side of the alternate vertical flow constructed wetland (3).

5. The device according to claim 1, characterized in that, the device further includes an acidification tank (1) and an aeration tank (2), wherein the acidification tank (1), the aeration tank (2) and the alternate vertical flow constructed wetland (3) are connected in sequence;

duckweed and algae salvaged from the basin are crushed, acidified and digested in the acidification tank (1), and then the supernatant is transported into the aeration tank (2), and optionally the COD of the supernatant transported to the aeration tank (2) is higher than 200 mg/L;

the supernatant from the acidification tank (1) is received by the aeration tank (2), and organic matters in the supernatant are degraded, optionally organic matters with long carbon chains are degraded into organic matters with short carbon chains, thereafter the degraded supernatant is fed into the alternate vertical flow constructed wetland (3); optionally, the average molecular weight of organic matters in water from the aeration tank (2) is lower than 308.24 Da.

6. The device according to claim 5, characterized in that, the acidification tank (1) is a container with an interlayer, in which there is a heat transfer medium, and the temperature of the heat transfer medium is measured by a temperature probe (5) of a temperature control device (4) to control the temperature in the acidification tank (1); and/or an aeration disk (10) is set at the lower part of the aeration tank (2), and an oxygen-containing fluid is introduced through the aeration disk (10) into the aeration tank (2); optionally, the oxygen-containing fluid is a nano-bubble water or an aqueous solution containing tiny bubbles with a size of 100-500 nm and dissolved oxygen amount of 10-25 mg/L.

7. A method for controlling pollutants in basin water used for irrigating farmland, characterized in that, the method includes: providing an alternate vertical flow constructed wetland 4-10 m far from a basin revetment to be irrigated, feeding basin water into the alternate vertical flow constructed wetland, and also into one or more layers of fillers laid in the alternate vertical flow constructed wetland to degrade or remove pollutants, thereafter transporting the treated basin water into the farmland;

optionally, the method further includes: providing an acidification tank and an aeration tank connected in sequence with the alternate vertical flow constructed wetland, salvaging duckweed and algae in the basin, then acidizing and digesting them in the acidification tank, importing the supernatant from the acidification tank into the aeration tank for further degradation, thereafter mixing water from the aeration tank with basin water and importing them into the alternate vertical flow constructed wetland;

wherein the acidification tank is a container with an interlayer, and the acidification tank is equipped with an agitator to crush the duckweed and algae; and/or microorganisms are added in the aeration tank, and said microorganisms comprise *Enterobacter* sp.; and/or wetland plants are planted in the alternate vertical flow constructed wetland, and the wetland plants are cattail and calamus.

8. The method according to claim 7, characterized in that, the method further includes adding denitrifying bacteria to basin water in a river, optionally the concentration of denitrifying bacteria in basin water in the river is 50-100 billion/g.

* * * * *